US011294993B2

(12) United States Patent
Zhong et al.

(10) Patent No.: US 11,294,993 B2
(45) Date of Patent: Apr. 5, 2022

(54) IDENTITY AUTHENTICATION USING BIOMETRICS

(71) Applicant: Advanced New Technologies Co., Ltd., Grand Cayman (KY)

(72) Inventors: Haojie Zhong, Hangzhou (CN); Xiangyu Zhao, Hangzhou (CN); Shuli Zhang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 223 days.

(21) Appl. No.: 15/903,801

(22) Filed: Feb. 23, 2018

(65) Prior Publication Data

US 2018/0181739 A1 Jun. 28, 2018

Related U.S. Application Data

(63) Continuation of application No. PCT/CN2016/095855, filed on Aug. 18, 2016.

(30) Foreign Application Priority Data

Aug. 27, 2015 (CN) .......................... 201510534755.4

(51) Int. Cl.
*G06F 21/32* (2013.01)
*G06F 21/33* (2013.01)
(Continued)

(52) U.S. Cl.
CPC .............. *G06F 21/32* (2013.01); *G06F 21/33* (2013.01); *G06F 21/62* (2013.01); *H04L 9/006* (2013.01);
(Continued)

(58) Field of Classification Search
CPC .......... G06F 21/32; G06F 21/33; G06F 21/62; H04L 9/006; H04L 9/3247; H04L 9/3263;
(Continued)

(56) References Cited

U.S. PATENT DOCUMENTS 5,280,527 A 1/1994 Gullman et al.
8,438,385 B2 5/2013 Song et al.
(Continued)

FOREIGN PATENT DOCUMENTS

CN 1705925 12/2005
CN 101101656 1/2008
(Continued)

OTHER PUBLICATIONS

Written Opinion in Singaporean Application No. 11201801435Q, dated Jan. 2, 2019, 6 pages.
(Continued)

*Primary Examiner* — Alexander Lagor
*Assistant Examiner* — Forrest L Carey
(74) *Attorney, Agent, or Firm* — Fish & Richardson P.C.

(57) ABSTRACT

A service request is received by a terminal device. First biometric authentication information of a user associated with the service request is collected. The first biometric authentication information is compared with preset biometric authentication information. When the comparison shows that the first biometric authentication information and the preset biometric authentication information are consistent, a pre-stored digital signature certificate private key is read. The service request is digitally signed according to the digital signature certificate private key. A biometric information verification message is generated and sent message to a server. The server is configured to read a pre-stored digital signature certificate public key corresponding to the digital signature certificate private key. Authentication result information is receiving from the server after the server verifies and signs the biometric information verification message according to the digital signature certificate public key.

20 Claims, 4 Drawing Sheets

(51) Int. Cl.
*G06F 21/62* (2013.01)
*H04L 9/32* (2006.01)
*H04L 9/00* (2022.01)
*H04L 29/06* (2006.01)

(52) U.S. Cl.
CPC .......... *H04L 9/3231* (2013.01); *H04L 9/3247* (2013.01); *H04L 9/3263* (2013.01); *H04L 9/3271* (2013.01); *H04L 63/0823* (2013.01); *H04L 63/0861* (2013.01); *H04L 2209/56* (2013.01)

(58) Field of Classification Search
CPC . H04L 63/0823; H04L 9/3231; H04L 9/3271; H04L 63/0861; H04L 2209/56
See application file for complete search history.

(56) References Cited

U.S. PATENT DOCUMENTS

| | | | |
|---|---|---|---|
| 2004/0059924 A1* | 3/2004 | Soto | G06F 21/32 713/186 |
| 2006/0176146 A1 | 8/2006 | Krishan et al. | |
| 2010/0287369 A1 | 11/2010 | Monden | |
| 2011/0082791 A1* | 4/2011 | Baghdasaryan | G06Q 20/40 705/44 |
| 2014/0156531 A1* | 6/2014 | Poon | G06Q 20/3229 705/44 |
| 2015/0046707 A1* | 2/2015 | Atherton | H04L 9/3231 713/168 |
| 2015/0046717 A1 | 2/2015 | Hagiwara et al. | |
| 2017/0277878 A1* | 9/2017 | Osotkraphun | G06F 21/31 |

FOREIGN PATENT DOCUMENTS

| | | |
|---|---|---|
| CN | 101101686 | 1/2008 |
| CN | 101101696 | 1/2008 |
| CN | 101340285 | 1/2009 |
| CN | 102880960 | 1/2013 |
| CN | 104899488 | 9/2015 |
| JP | 2002222022 | 8/2002 |
| JP | 2005038257 | 2/2005 |
| JP | 2008204347 | 9/2008 |
| JP | 2009169809 | 7/2009 |
| JP | 2011070325 | 4/2011 |

OTHER PUBLICATIONS

International Search Report issued by the International Searching Authority in International Application No. PCT/CN2016/095855 dated Nov. 11, 2016; 8 pages.

European Extended Search Report in European Application No. 16838522.7, dated Mar. 13, 2019, 7 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Fidoalliance.org [online], "FIDO UAF Protocol Specification," Dec. 8, 2014, retrieved on Oct. 19, 2020, retrieved from URL<https://fidoalliance.org/specs/fido-uaf-v1.0-ps-20141208/fido-uaf-protocol-v1.0-ps-20141208.html>, 45 pages.

* cited by examiner

IDENTITY AUTHENTICATION USING BIOMETRICS

This application is a continuation of PCT Application No. PCT/CN2016/095855, filed on Aug. 18, 2016, which claims priority to Chinese Patent Application No. 201510534755.4, filed on Aug. 27, 2015, and each application is incorporated by reference in its entirety.

BACKGROUND

The present disclosure relates to the field of computer technologies, and in particular, to identity authentication. In conventional technology, the identity of a user is generally authenticated by verifying a password (for example, a 6-digit, or longer, alpha-numeric string) input by the user, and the user can perform an operation after the identity of the user is authenticated. However, in this case, the user usually needs to memorize the password, which may cause inconvenience to the user. In addition, a significant threat may be posed to the user if the password is stolen.

SUMMARY

The present disclosure describes techniques for identity authentication using biometric information. In an implementation, a service request is received by a terminal device. First biometric authentication information of a user associated with the service request is collected. The first biometric authentication information is compared with preset biometric authentication information. When the comparison shows that the first biometric authentication information and the preset biometric authentication information are consistent, a pre-stored digital signature certificate private key is read. The service request is digitally signed according to the digital signature certificate private key. A biometric information verification message is generated and sent message to a server. The server is configured to read a pre-stored digital signature certificate public key corresponding to the digital signature certificate private key. Authentication result information is receiving from the server after the server verifies and signs the biometric information verification message according to the digital signature certificate public key.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. The security and convenience of a service operation performed by the user is improved.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes identity authentication using biometric information, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In some implementations of described identity authentication techniques, a terminal device can send, to a server, a biometric information verification message signed using a pre-stored digital signature certificate private key. The sending can occur, for example, when the comparison shows that collected biometric authentication information is consistent with preset biometric authentication information. The server can verify and sign the biometric information verification message according to a pre-stored digital signature certificate public key. This can achieve an objective of verifying the identity of a user.

The described identity authentication techniques can be applied to scenarios in which the identity of a user performing a service operation is to be authenticated, for example, in a scenario in which the identity is to be authenticated for a user performing a payment operation by using a payment system. In the present disclosure, although authentication of the identity of a user in a payment process is used as an example in which a service request is a payment request, the same or similar forms of authentication of the identity of the user can occur when the user is performing other service operations.

The payment system can include a payment client and a payment server. A first security component can be included in the payment client. The first security component can also be referred to as a security client, or a "payment security check service" (for example, an ALIPAYSEC module) that is configured to store a digital signature algorithm, a security client private key, a security server public key, and a newly generated digital signature certificate private key. The security client can directly communicate with a collection module (for example, a fingerprint sensor) of a terminal device by using an operating system. Communication can also be direct communication with a trusted execution environment (TEE) provided by a terminal device provider. For example, communication can occur when invoking the collection module to check whether the terminal device supports identification of biometric authentication information, whether biometric authentication information is recorded, or whether biometric authentication information input by a user is verified. Communication can also occur when securing access to information and algorithms for authentication.

In some implementations, a second security component can also be included in the payment server. The second security component can also be referred to as a security server or a "biometric core" (BIC) system. The second security component can be configured to generate authentication challenge information and store the digital signature algorithm, the security client public key, the security server private key, a registration agreement for biometric authentication information (for example, a registration agreement for fingerprints), and a newly generated digital signature certificate public key. The security server can correspond to the security client.

In some implementations, the described terminal device can include, but is not limited to, a mobile phone, a mobile computer, a tablet computer, a personal digital assistant, (PDA), a media player, a smart television, a smart watch, smart glasses, a smart wristband, or other device. The operating system on the terminal device can be, for example, an IOS, ANDROID, WINDOWS, or LINUX system. In addition, the described terminal device can be installed with a payment client, and can be provided with a collection module. The collection module can be a hardware device, such as a fingerprint sensor, a camera, a microphone, or other module.

Figure 1:
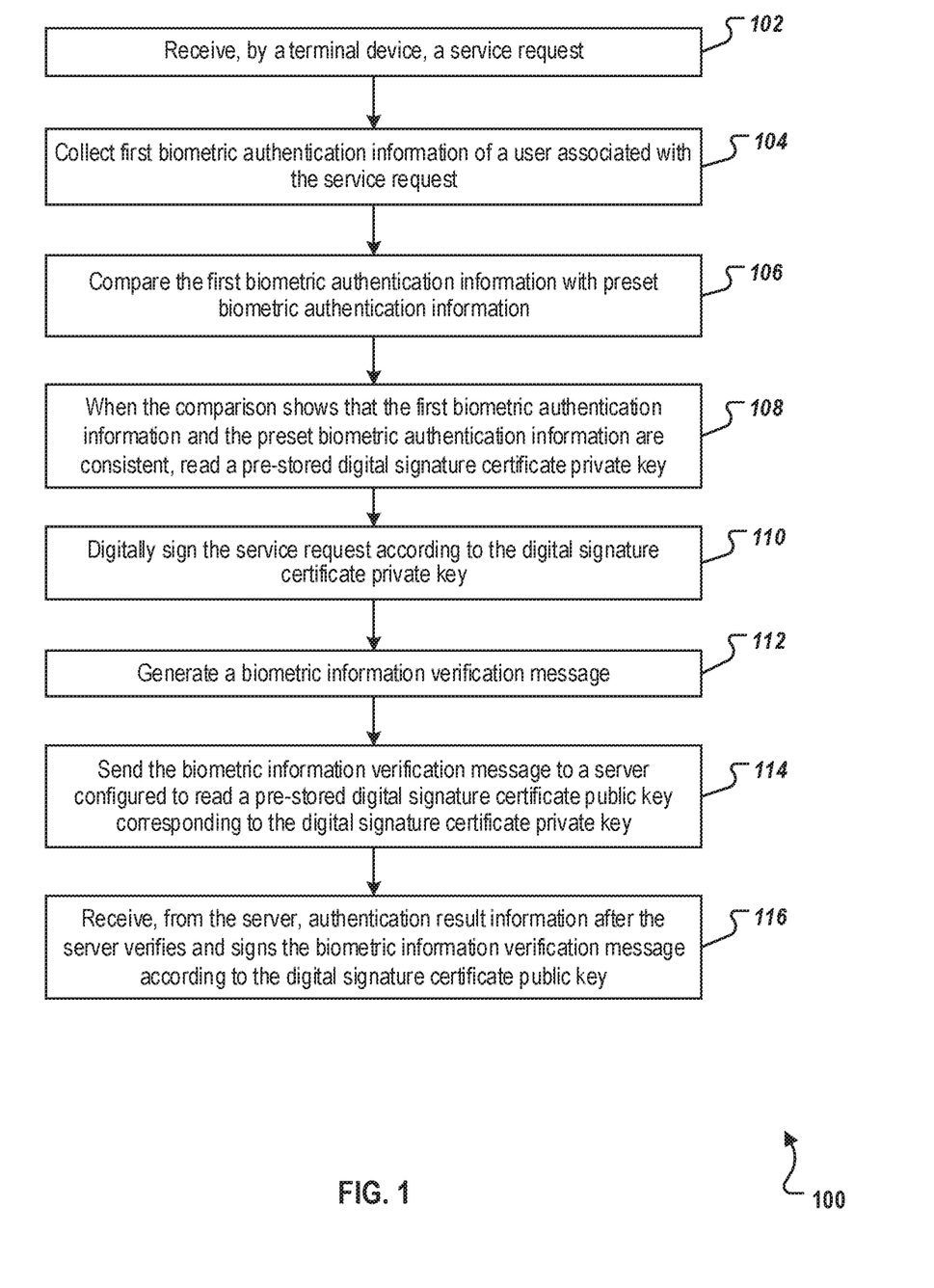
FIG. 1 is a flowchart illustrating an example of an identity authentication method, according to an implementation of the present disclosure.

FIG. 1 is a flowchart illustrating an example of an identity authentication method 100, according to an implementation of the present disclosure. Method 100 can be performed by a device with processing capability such as a server or a system. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, a service request is received at a terminal. For example, a payment client of the terminal device can receive the service request. The payment client can send a first collection instruction to a collection module by using a security client so that the collection module can collect and return biometric authentication information of the user to the security client. In some implementations, the service request can be a payment request that is triggered, for example, by the user clicking a "Pay" button of the payment client or performing some other operation. In some implementations, before the service request is received at the terminal at 102, a digital signature certificate private key and a digital signature certificate public key can be generated and stored, for example, using method 200, described with reference to FIG. 2. From 102, method 100 proceeds to 104.

At 104, first biometric authentication information of a user according to the service request is collected. The biometric authentication information can include one or more of the following: fingerprint information, face image information, and voice information. While provided examples describe use of preset fingerprint information as biometric authentication information, other forms of biometric authentication information can be used in other implementations. Preset biometric authentication information can include, for example, information collected in advance by the collection module of the terminal device and capable of uniquely identifying a user. For example, when the preset biometric authentication information is preset fingerprint information, the terminal device can collect fingerprint information of the user in advance by using a fingerprint sensor, and then store the collected fingerprint information locally as the preset fingerprint information. The preset fingerprint information can be obtained by calculating collected actual fingerprint information according to a preset algorithm. For example, the fingerprint sensor can collect fingerprint information for the same finger ten times, then calculate and store an average composite based on the information. From 104, method 100 proceeds to 106.

At 106, the first biometric authentication information is compared with preset biometric authentication information. For example, the security client can compare the first biometric authentication information with preset biometric authentication information. From 106, method 100 proceeds to 108.

At 108, when the comparison shows that the first biometric authentication information and the preset biometric authentication information are consistent, a pre-stored digital signature certificate private key is read. For example, the security client can read a pre-stored digital signature certificate private key when the comparison shows that the first biometric authentication information and the preset biometric authentication information are consistent. From 108, method 100 proceeds to 110.

At 110, the service request is digitally signed according to the digital signature certificate private key. For example, during a payment scenario, the service request can be a payment request, and the security client can digitally sign the payment request according to a read digital signature certificate private key. From 110, method 100 proceeds to 112.

At 112, a biometric information verification message is generated. For example, the security client can generate the biometric information verification message, and then the security client can send the generated biometric information verification message to the payment client. From 112, method 100 proceeds to 114.

At 114, the biometric information verification message is sent to a server. The server can be configured to read a pre-stored digital signature certificate public key corresponding to the digital signature certificate private key. For example, the payment client can send the biometric information verification message to the payment server. The payment server can read, from the security server, the pre-stored digital signature certificate public key corresponding to the digital signature certificate private key. From 114, method 100 proceeds to 116.

At 116, authentication result information is received at the terminal. This occurs, for example, after the server verifies and signs the biometric information verification message according to the digital signature certificate public key. After 116, method 100 stops.

In some implementations, the payment client can encrypt the sent service request. The payment server can decrypt the encrypted service request according to a preset algorithm after verifying and signing the biometric information verification message according to the digital signature certificate public key. After the decryption succeeds, the payment server can then return result information to the payment client indicating that the authentication has succeeded.

Figure 2:
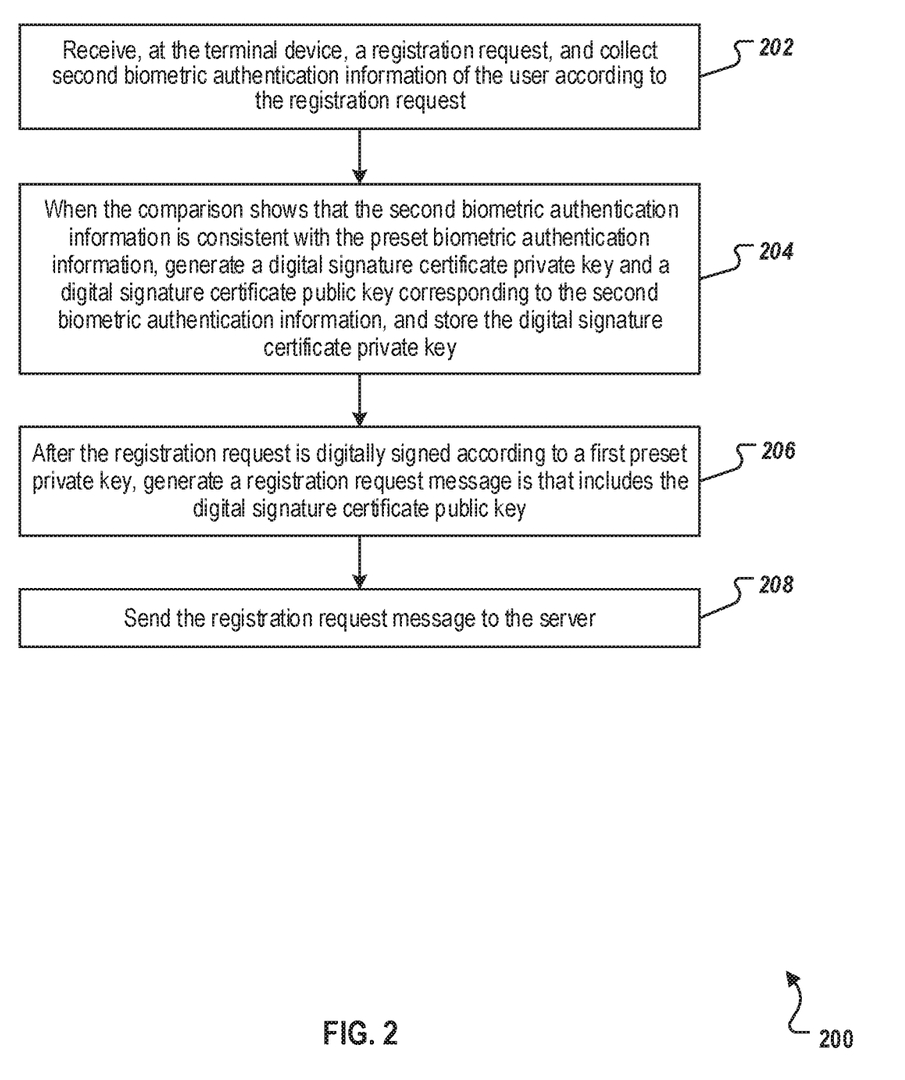
FIG. 2 is a flowchart illustrating an example of a method, according to an implementation of the present disclosure.

FIG. 2 is a flowchart illustrating an example of a method 200, according to an implementation of the present disclosure. Method 200 can be performed, for example, before the service request is received at the terminal at 102 in method 100. Method 200 can be performed by a device with processing capability such as a server or a system. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a registration request is received at the terminal device, and second biometric authentication information of the user is collected according to the registration request. For example, the payment client of the terminal device can send the registration request to the payment server. The payment server can then read authentication challenge information by invoking a security server. The authentication challenge information can be generated after the security server digitally signs, by using a preset security server private key, a random character string generated for the registration request. Next, a response message returned by the server according to the registration request is received. For example, the payment client can receive the response message. The response message can be authentication challenge information read by the payment server by using the security server. Next, the response message can be verified and signed, and the second biometric authentication information of the user can be collected after the verification and signature succeed. For example, the payment client can verify and sign the received authentication challenge information by invoking the security client. In some implementations, the security client can verify and sign the authentication challenge information according to a preset security server public key. Then, the security client can send a second collection instruction to the collection module after the verification and signature succeed. The collection module can collect the second biometric authentication information of the user according to the second collection instruction.

In an example in which the biometric authentication information is fingerprint information, the payment client can first receive a registration request input by the user. The payment client can send a first invocation message to the security client after receiving the registration request. The first invocation message can be used for instructing the security client to check whether a terminal device currently used by the user supports fingerprint payment and whether preset fingerprint information is stored in the fingerprint sensor. The security client can check, by invoking a service such as hardwarePayExecute (for example, type=QUICKPAY_REQUEST_TYPE_INIT), whether a terminal device currently used by the user supports fingerprint payment and whether preset fingerprint information is stored in the fingerprint sensor. If the terminal device supports fingerprint payment, and if preset fingerprint information is stored in the fingerprint sensor, then the security client can return, to the payment client, information indicating that fingerprint payment is supported. Then, the payment client then can display a slide button to the user, for example, for collection of a fingerprint. Upon reception of a slide instruction executed for the slide button (for example, the user wants to provide a fingerprint for a fingerprint payment), the payment client can display a legal document to the user.

When the payment client receives an acknowledgement instruction input by the user, the acknowledgement instruction can be triggered when the user provides a confirmation, for example, by selecting "I Understand" or some other confirmation after viewing the displayed legal document. The payment client can send a registration request to the payment server, for example, by invoking a service such as getBiometricRegRequestPRC (for example, defining a device unique identifier (ID), a mobile phone device model, and a universal identifier (UID) of a logged-in user). Invoking the service can result in the payment server sending a second invocation message to the security server. For example, the payment server can send a second invocation message by invoking a service such as mobileBiometricService.getRegRequest. After receiving the second invocation message, the security server can generate a random character string according to information such as a current timestamp. The security server can then digitally sign the random character string by using a security server private key (for example, a preset security server private key) that is pre-stored at the security server. The security server can then generate authentication challenge information and return the generated authentication challenge information to the payment server. After reading the authentication challenge information, the payment server can forward the authentication challenge information to the payment client. The security client can verify and sign the authentication challenge information, including determining whether the currently received authentication challenge information is sent by the security server, and to determine whether the currently received authentication challenge information is modified. When the security client determines that the currently received authentication challenge information is sent by the security server and the sent authentication challenge information is not modified, the security client can indicate that a data channel between the security client and the security server is secure. As a result, a second collection instruction can be sent to the fingerprint sensor (for example, the collection module), and the collection module can collect second biometric authentication information of the user after receiving the second collection instruction. From 202, method 200 proceeds to 204.

At 204, when the comparison shows that the second biometric authentication information is consistent with the preset biometric authentication information, a digital signature certificate private key and a digital signature certificate public key corresponding to the second biometric authentication information are generated, and the digital signature certificate private key is stored. For example, after collecting the second biometric authentication information of the user according to the collection instruction, the collection module can return the second biometric authentication information to the security client. The security client can compare the second biometric authentication information with the preset biometric authentication information. When the comparison shows that the second biometric authentication information and the preset biometric authentication information are consistent, the security client can generate the digital signature certificate private key and the digital signature certificate public key corresponding to the second biometric authentication information. The security client can then store the digital signature certificate private key.

In some implementations, before generating the digital signature certificate private key and the digital signature certificate public key corresponding to the second biometric authentication information, the security client can receive a first message sent by the payment client that includes a unique identifier (ID) of the user and an ID of the terminal device. In some implementations, generating the digital signature certificate private key and the digital signature certificate public key corresponding to the second biometric authentication information can include generating, by the security client, the digital signature certificate private key and the digital signature certificate public key corresponding to the second biometric authentication information according to an ID of the user, an ID of the terminal device, and result information of the comparison showing consistency.

The ID of the user can be information generated by a payment system and used for uniquely identifying a user. In some implementations, the ID of the user can be read directly from a session. The ID of the terminal device can be, for example, an International Mobile Equipment Identification Number (IMEI). The digital signature certificate public key and the digital signature certificate private key can be generated when the comparison by the security client shows that the second biometric authentication information and the preset biometric authentication information are consistent. The digital signature certificate private key and the digital signature certificate public key can also be referred to as the digital signature certificate private key and the digital signature certificate public key corresponding to the second biometric authentication information. The indication that the result information of the comparison shows consistency can be the same as result information of the comparison showing that the second biometric authentication information and the preset biometric authentication information are consistent.

After generating the digital signature certificate public key and the digital signature certificate private key, the security client can store the digital signature certificate private key. In some implementations, when an operating system of the terminal device is an Android system, for example, the digital signature certificate private key can be stored in a trusted execution environment (TEE) of the security client.

In some implementations, when fingerprint payment, image recognition payment, and voice payment are registered for the first time, the terminal device can immediately generate, after collecting the second biometric authentication information, the digital signature certificate public key and the digital signature certificate private key corresponding to the biometric authentication information. In this case, the terminal device does not need to compare the second biometric authentication information with the preset biometric authentication information, and then only performs the generation step when the comparison shows the information are consistent. From 204, method 200 proceeds to 206.

At 206, after the registration request is digitally signed according to a first preset private key, a registration request message is generated that includes the digital signature certificate public key. The first preset private key can be a preset security client private key. For example, the security client can generate the registration request message after digitally signing the registration request by using the preset security client private key. In some implementations, the registration request can include authentication challenge information, and the authentication challenge information and the digital signature certificate public key can be digitally signed before the registration request message is generated. From 206, method 200 proceeds to 208.

At 208, the registration request message is sent to the server. The server can store the digital signature certificate public key after verifying and signing the registration request message according to a first preset public key, where the first preset private key corresponds to the first preset public key. The first preset public key can be a preset security client public key. For example, the security client can send the registration request message to the payment client. The payment client can forward the registration request message to the security server through the payment server. The security server can verify and sign the registration request message according to the preset security client public key and the store the digital signature certificate public key after the verification and signature succeed.

In some implementations, sending the registration request message to the server can include verifying, by the terminal device, whether the user is a valid user. The terminal device can check an original payment password when the user is a valid user. The terminal device can send the registration request message to the server when the check succeeds. After 208, method 200 stops.

In some implementations, the payment client can first acquire a mobile phone number bound to the current user and send a short message to a mobile phone of the mobile phone number. Upon receiving a message indicating acknowledgment, the payment client can receive an original payment password input by the user. The payment client can then forward the registration request message to the security server by using the payment server when check of the original payment password succeeds. In this way, the verification can determine whether the current user is a user of the payment client, so that the security of a payment operation can be improved.

In some implementations, the payment client can send the registration request message to the payment server by invoking a service, for example, registerBiometricPRC (including a device ID, a mobile phone device model, a fingerprint registration message, and a UID of a logged-in user). After the payment server forwards the registration request message to the security server, the security server can verify and sign the registration request message according to the preset security client public key. Then, the security server can parse and store the digital signature certificate public key in the registration request message after the verification and signature succeed. The preset security client private key can correspond to the preset security client public key. After the verification and signature of the registration request message succeed, a message indicating that the verification and signature succeed can be returned to the payment server. Then, the payment server can return the message to the payment client indicating that the verification and signature have succeeded. The payment client can display a message, to the user, that the user's identity can be authenticated in a payment process by inputting fingerprint information, face image information, voice information, or some other biometric input. In some implementations, an amount of payment of the transaction can be limited, such as according to a security level or a credit limit of a different terminal device.

After the digital signature certificate private key and the digital signature certificate public key are generated and stored, user authentication can occur. For example, when making an order payment by using a payment system, the user can authenticate the user's identity by inputting one or more of fingerprint information, face image information, and voice information. A payment operation can be performed after the identity authentication succeeds.

Figure 3:
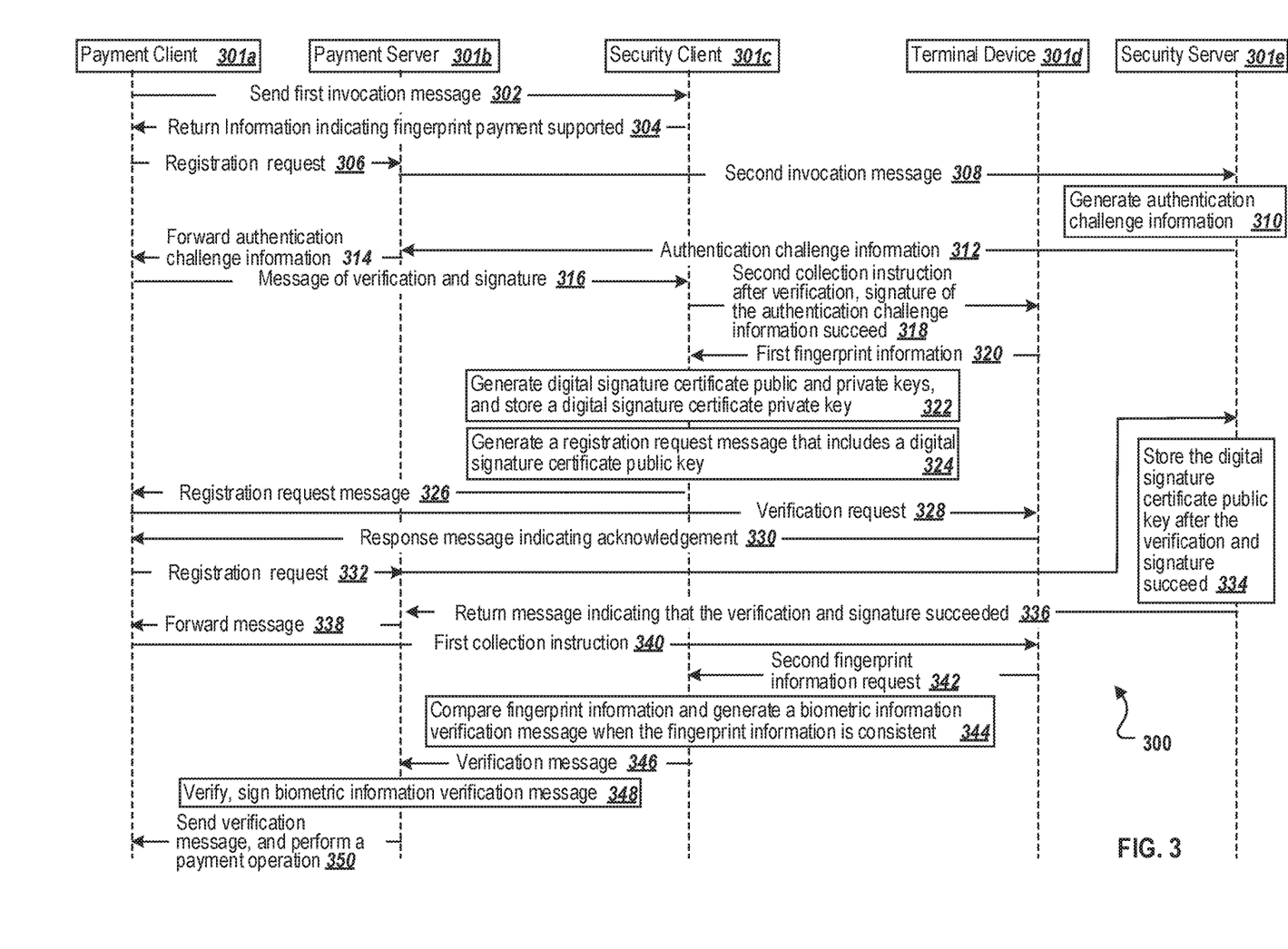
FIG. 3 is a swim lane diagram illustrating an example of an information exchange method that occurs during an identity authentication, according to implementation of the present disclosure.

FIG. 3 is a swim lane diagram illustrating an example of an information exchange method 300 that occurs during an identity authentication, according to implementation of the present disclosure. The exchange can apply, for example, to a scenario in which a fingerprint payment is requested and identity of a user is authenticated by verifying fingerprint information after fingerprint payment is registered. Entities that perform steps of method 300 include a payment client 301a, a payment server 301b, a security client 301c, a terminal device 301d, and a security server 301e. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, a payment client sends a first invocation message to a security client according to a received registration request. The first invocation message can be used for instructing the security client to check whether a terminal device currently used by a user supports fingerprint payment and whether preset fingerprint information is stored in the fingerprint sensor. In some implementations, the security client can check, for example by invoking a service such as hardwarePayExecute (for example, identifying type=QUICKPAY_REQUEST_TYPE_INIT), whether a terminal device currently used by the user supports fingerprint payment and whether preset fingerprint information is stored in the fingerprint sensor. From 302, method 300 proceeds to 304.

At 304, the security client returns information of support to the payment client. From 304, method 300 proceeds to 306.

At 306, the payment client sends the registration request to a payment server. The payment client can send the registration request to the payment server, for example, by invoking a service getBiometricRegRequestPRC (for example, identifying a device ID, a mobile phone device model, and a UID of a logged-in user). From 306, method 300 proceeds to 308.

At 308, the payment server sends a second invocation message to a security server according to the received registration request. The payment server can send the second invocation message to the security server, for example, by invoking a service mobileBiometricService.getRegRequest. From 308, method 300 proceeds to 310.

At 310, the security server generates a random character string, and generates authentication challenge information after digitally signing the generated random character string by using a preset security server private key. From 310, method 300 proceeds to 312.

At 312, the security server returns the generated authentication challenge information to the payment server. From 312, method 300 proceeds to 314.

At 314, the payment server forwards the authentication challenge information to the payment client. From 314, method 300 proceeds to 316.

At 316, the payment client sends the authentication challenge information to the security client. The payment client can send the authentication challenge information to the security client, for example, by invoking a service such as hardwarePayExecute (for example, identifying type=QUICKPAY_REQUEST_TYPE_REGISTER, and data=authentication challenge information). From 316, method 300 proceeds to 318.

At 318, the security client verifies and signs the authentication challenge information according to a preset security server public key, and sends a second collection instruction to a fingerprint sensor of a terminal device after the verification and signature succeed. From 318, method 300 proceeds to 320.

At 320, the fingerprint sensor of the terminal device sends first fingerprint information of the user collected in real time to the security client. From 320, method 300 proceeds to 322.

At 322, the security client generates, when the comparison shows that the first fingerprint information collected in real time and preset fingerprint information are consistent, a digital signature certificate private key and a digital signature certificate public key corresponding to the first fingerprint information of the user, and stores the digital signature certificate private key.

In some implementations, the security client can receive a first message sent by the payment client that includes a unique identifier ID of the user and an ID of the terminal device. In some implementations, generating the digital signature certificate private key and a digital signature certificate public key corresponding to the first fingerprint information can include generating, by the security client, the digital signature certificate private key and the digital signature certificate public key corresponding to the first fingerprint information of the user according to an ID of the user, an ID of the terminal device, and result information of the comparison showing consistency. The result information of the comparison showing consistency can be result information of the comparison showing that the first fingerprint information collected in real time and the preset fingerprint information are consistent. From 322, method 300 proceeds to 324.

At 324, the security client generates a registration request message after digitally signing the authentication challenge information by using a preset security client private key, where the registration request message can include a digital signature certificate public key. From 324, method 300 proceeds to 326.

At 326, the security client sends the registration request message to the payment client. From 326, method 300 proceeds to 328.

At 328, the payment client sends a verification request to the terminal device. From 328, method 300 proceeds to 330.

At 330, the terminal device sends a response message indicating acknowledgment to the payment client. From 330, method 300 proceeds to 332.

At 332, the payment client receives an original payment password input by the user, and forwards the registration request message to the security server by using the payment server when the original payment password is correct. From 332, method 300 proceeds to 334.

At 334, the security server stores, after the verification and signature of the registration request message according to a preset security client public key succeed, a digital signature certificate public key stored in the registration request message. From 334, method 300 proceeds to 336.

At 336, the security server returns a message indicating that verification and signature succeed to the payment server. From 336, method 300 proceeds to 338.

At 338, the payment server forwards the message indicating that verification and signature succeed to the payment client. From 338, method 300 proceeds to 340.

At 340, the payment client sends a first collection instruction to the fingerprint sensor of the terminal device through the security client according to a received payment request. The first collection instruction can be used for instructing the fingerprint sensor to collect and return second fingerprint information of the user to the security client. From 340, method 300 proceeds to 342.

At 342, the security client receives the second fingerprint information collected by the fingerprint sensor in real time, and compares the second fingerprint information with preset fingerprint information. From 342, method 300 proceeds to 344.

At 344, a pre-stored digital signature certificate private key is read when the comparison shows that the second fingerprint information and the preset fingerprint information are consistent, and a biometric information verification message is generated after a payment request message is digitally signed by using the digital signature certificate private key. From 344, method 300 proceeds to 346.

At 346, the security client sends the biometric information verification message to the payment server by using the payment client. From 346, method 300 proceeds to 348.

At 348, the payment server reads a pre-stored digital signature certificate public key from the security server, and verifies and signs the biometric information verification message according to the digital signature certificate public key. From 348, method 300 proceeds to 350.

At 350, the payment client receives a message indicating whether the authentication succeeds returned by the payment server, and performs a payment operation after receiving a message indicating that the authentication succeeds. After 350, method 300 stops.

In summary, according to the identity authentication method provided in the present disclosure, when fingerprint information of a user is collected, a digital signature certificate private key stored in a security client can be unlocked, and verification can be performed during identity authentication by using the digital signature certificate private key instead of the fingerprint information. In this way, an objective of replacing an original payment password can be achieved, and the security and convenience of a payment operation by the user can be improved.

In some implementations, steps 302 through 338 can be referred to as a fingerprint payment registration procedure. The fingerprint payment registration procedure can be applied to any biometric identification and identity authentication process, for example, identity authentication at various security levels using one or more of an iris, a face, or a wristband.

Figure 4:
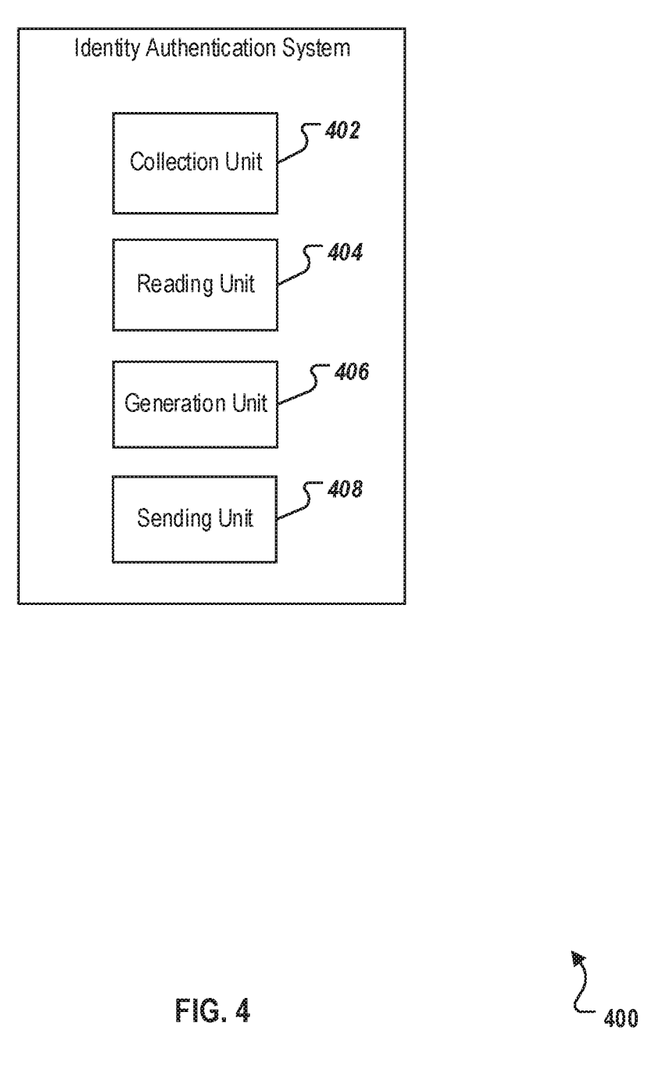
FIG. 4 is a block diagram illustrating an example of an identity authentication system, according to an implementation of the present disclosure.

FIG. 4 is a block diagram illustrating an example of an identity authentication system 400, according to an implementation of the present disclosure. Components of the identity authentication system 400 can perform methods 100, 200 and 300, for example. The identity authentication system 400 can be applied to identity authentication during payment, for example, in which a service request is a payment request. The system 400 can include a collection unit 402, a reading unit 404, a generation unit 406, and a sending unit 408.

The collection unit 402 can be configured to receive a service request and collect first biometric authentication information of a user according to the service request. The biometric authentication information can include one or more of the following: fingerprint information, face image information, and voice information. The reading unit 404 can be configured to compare the first biometric authentication information collected by the collection unit 402 with preset biometric authentication information. The reading unit 404 can also be configured to read a pre-stored digital signature certificate private key when the comparison shows that the first biometric authentication information and the preset biometric authentication information are consistent.

The generation unit 406 can be configured to digitally sign the service request according to the digital signature certificate private key read by the reading unit 404, and generate a biometric information verification message. The sending unit 408 can be configured to send the biometric information verification message generated by the generation unit 406 to a server. The server can read a pre-stored digital signature certificate public key corresponding to the digital signature certificate private key. The server can return, after verifying and signing the biometric information verification message according to the digital signature certificate public key, authentication result information to a terminal device.

In some implementations, the collection unit 402 can further be configured to receive a registration request and collect second biometric authentication information of the user according to the registration request. In some implementations, the collection unit 402 can further be configured to send the registration request to the server, receive a response message returned by the server according to the registration request and verify and sign the response message, and collect the second biometric authentication information of the user after the verification and signature succeed.

In some implementations, the generation unit 406 can further be configured to generate, when the comparison shows that the second biometric authentication information collected by the collection unit 402 is consistent with the preset biometric authentication information, a digital signature certificate private key and a digital signature certificate public key corresponding to the second biometric authentication information, and store the digital signature certificate private key. In some implementations, the generation unit 406 can further be configured to generate the digital signature certificate private key and the digital signature certificate public key corresponding to the second biometric authentication information according to an ID of the user, an ID of the terminal device, and result information of the comparison showing consistency. In some implementations, the generation unit 406 can further be configured to generate, after the registration request is digitally signed according to a first preset private key, a registration request message, where the registration request message includes the digital signature certificate public key.

In some implementations, the sending unit 408 can further be configured to send the registration request message generated by the generation unit 406 to the server. The server can store, after verifying and signing the registration request message according to a first preset public key, the digital signature certificate public key, where the first preset private key corresponds to the first preset public key. In some implementations, the sending unit 408 can further be configured to verify whether the user is a valid user, check an original payment password when the user is a valid user, and send the registration request message to the server when the check succeeds.

In summary, the collection unit 402 can receive a service request and can collect first biometric authentication information of a user according to the service request. The reading unit 404 can compare the first biometric authentication information with preset biometric authentication information and can read a pre-stored digital signature certificate private key when the comparison shows that the first biometric authentication information and the preset biometric authentication information are consistent. The generation unit 406 can digitally sign the service request according to the digital signature certificate private key, and can generate a biometric information verification message. The sending unit 408 can send the biometric information verification message to a server. The server can read a pre-stored digital signature certificate public key corresponding to the digital signature certificate private key. The server can return, after verifying and signing the biometric information verification message according to the digital signature certificate public key, authentication result information to a terminal device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on non-transitory computer storage media for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple Compact Discs (CDs), Digital Video Discs (DVDs), magnetic disks, or other storage devices).

The operations described in this specification can be implemented as operations performed by a data processing apparatus on data stored on one or more computer-readable storage devices or received from other sources.

The terms "data processing apparatus," "computer," or "computing device" encompass all kinds of apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application specific integrated circuit (ASIC). The apparatus can also include, in addition to hardware, code that creates an execution environment for the computer program in question, for example, code that constitutes processor firmware, a protocol stack, a database management system, an operating system (for example, LINUX, UNIX, WINDOWS, MAC OS, ANDROID, IOS, another operating system, or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile device, a personal digital assistant (PDA), a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and CD ROM and DVD-ROM disks. The processor and the memory can be supplemented by, or incorporated in, special purpose logic circuitry.

Mobile devices can include mobile telephones (for example, smartphones), tablets, wearable devices (for example, smart watches, smart eyeglasses, smart fabric, smart jewelry), implanted devices within the human body (for example, biosensors, smart pacemakers, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors.

To provide for interaction with a user, embodiments of the subject matter described in this specification can be implemented on a computer having a display device, for example, a cathode ray tube (CRT) or liquid crystal display (LCD) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented using computing devices interconnected by any form or medium of wireline or wireless digital data communication (or combination thereof), for example, a communication network. Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Worldwide Interoperability for Microwave Access (WIMAX), Long Term Evolution (LTE), Code Division Multiple Access (CDMA), 5G protocols, IEEE 802.11 a/b/g/n or 802.20 protocols (or a combination of 802.11x and 802.20 or other protocols consistent with the present disclosure), Internet Protocol (IP), Frame Relay, Asynchronous Transfer Mode (ATM), ETHERNET, or other protocols or combinations of protocols. The communication network can transmit voice, video, data, or other information between the connected computing devices.

Embodiments of the subject matter described in this specification can be implemented using clients and servers interconnected by a communication network. A client and server are generally remote from each other and typically interact through a communication network. The relationship of client and server arises by virtue of computer programs running on the respective computers and having a client-server relationship to each other.

What is claimed is:

1. A computer-implemented method, comprising:
obtaining, by a user device, a first invocation message;
responsive to obtaining the first invocation message, determining the user device supports collecting biometric information and that preset biometric authentication information is stored on the user device, wherein the preset biometric authentication information is stored on the user device prior to obtaining the first invocation message;
sending, by the user device, information based on determining the user device supports collecting the biometric information and that the preset biometric authentication information is stored on the user device to a payment client;
receiving, by the user device, a service request;
collecting first biometric authentication information of a user associated with the service request;
comparing the first biometric authentication information with the preset biometric authentication information;
determining the first biometric authentication information and the preset biometric authentication information are consistent;
reading a pre-stored digital signature certificate private key; wherein the digital signature certificate private key is generated based on a verification of an ID of the user, an ID of the user device, and result information of a comparison between the first biometric authentication information and the preset biometric authentication information;
digitally signing the service request according to the digital signature certificate private key;
generating a biometric information verification message;
sending the biometric information verification message to a server, wherein the server is configured to read a pre-stored digital signature certificate public key corresponding to the digital signature certificate private key; and
receiving, from the server, authentication result information after the server verifies the biometric information verification message according to the digital signature certificate public key.

2. The computer-implemented method of claim 1, wherein the method further comprises generating and storing the digital signature certificate private key and the digital signature certificate public key, comprising:
receiving, by the user device, a registration request, and collecting second biometric authentication information of the user according to the registration request;
when the comparison shows that the second biometric authentication information is consistent with the preset biometric authentication information, generating the digital signature certificate private key and the digital signature certificate public key corresponding to the second biometric authentication information, and storing the digital signature certificate private key;
after the registration request is digitally signed according to a first preset private key, generating a registration request message, wherein the registration request message includes the digital signature certificate public key; and
sending the registration request message to the server configured to store, after verifying and signing of the registration request message according to a first preset public key succeed, the digital signature certificate public key, wherein the first preset private key corresponds to the first preset public key.

3. The computer-implemented method of claim 2, wherein receiving the registration request and collecting the second biometric authentication information of the user according to the registration request comprises:
sending, by the user device, the registration request to the server;
receiving, from the server, a response message associated with the registration request;
verifying and signing the response message; and
after the verification and signature succeed, collecting the second biometric authentication information of the user.

4. The computer-implemented method of claim 2, wherein sending the registration request message to the server comprises:
verifying, by the user device, that the user is a valid user;

performing a check on an original payment password responsive to verifying that the user is a valid user;
determining that the check is successful; and
responsive to determining that the check is successful, sending the registration request message to the server.

5. The computer-implemented method of claim 2, wherein generating the digital signature certificate public key comprises generating the digital signature certificate public key corresponding to the ID of the user, the ID of the user device, and the result of the comparison.

6. The computer-implemented method of claim 1, wherein biometric authentication information comprises one or more of fingerprint information, face image information, and voice information.

7. The computer-implemented method of any of claim 1, wherein the service request is a payment request, and wherein authentication is identity authentication during payment.

8. A non-transitory, computer-readable medium storing one or more instructions executable by a computer system to perform operations comprising:
obtaining, by a user device, a first invocation message;
responsive to obtaining the first invocation message, determining the user device supports collecting biometric information and that preset biometric authentication information is stored on the user device, wherein the preset biometric authentication information is stored on the user device prior to obtaining the first invocation message;
sending, by the user device, information based on determining the user device supports collecting the biometric information and that the preset biometric authentication information is stored on the user device to a payment client;
receiving, by the user device, a service request;
collecting first biometric authentication information of a user associated with the service request;
comparing the first biometric authentication information with the preset biometric authentication information;
determining the first biometric authentication information and the preset biometric authentication information are consistent;
reading a pre-stored digital signature certificate private key; wherein the digital signature certificate private key is generated based on a verification of an ID of the user, an ID of the user device, and result information of a comparison between the first biometric authentication information and the preset biometric authentication information;
digitally signing the service request according to the digital signature certificate private key;
generating a biometric information verification message;
sending the biometric information verification message to a server, wherein the server is configured to read a pre-stored digital signature certificate public key corresponding to the digital signature certificate private key; and
receiving, from the server, authentication result information after the server verifies the biometric information verification message according to the digital signature certificate public key.

9. The non-transitory, computer-readable medium of claim 8, wherein the operations further comprise generating and storing the digital signature certificate private key and the digital signature certificate public key, comprising:

receiving, by the user device, a registration request, and collecting second biometric authentication information of the user according to the registration request;
when the comparison shows that the second biometric authentication information is consistent with the preset biometric authentication information, generating the digital signature certificate private key and the digital signature certificate public key corresponding to the second biometric authentication information, and storing the digital signature certificate private key;
after the registration request is digitally signed according to a first preset private key, generating a registration request message, wherein the registration request message includes the digital signature certificate public key; and
sending the registration request message to the server configured to store, after verifying and signing of the registration request message according to a first preset public key succeed, the digital signature certificate public key, wherein the first preset private key corresponds to the first preset public key.

10. The non-transitory, computer-readable medium of claim 9, wherein receiving the registration request and collecting the second biometric authentication information of the user according to the registration request comprises:
sending, by the user device, the registration request to the server;
receiving, from the server, a response message associated with the registration request;
verifying and signing the response message; and
after the verification and signature succeed, collecting the second biometric authentication information of the user.

11. The non-transitory, computer-readable medium of claim 9, wherein sending the registration request message to the server comprises:
verifying, by the user device, that the user is a valid user;
performing a check on an original payment password responsive to verifying that the user is a valid user;
determining that the check is successful; and
responsive to determining that the check is successful, sending the registration request message to the server.

12. The non-transitory, computer-readable medium of claim 9, wherein generating the digital signature certificate public key comprises generating the digital signature certificate public key corresponding to the ID of the user, the ID of the user device, and the result of the comparison.

13. The non-transitory, computer-readable medium of claim 8, wherein biometric authentication information comprises one or more of fingerprint information, face image information, and voice information.

14. The non-transitory, computer-readable medium of claim 8, wherein the service request is a payment request, and wherein authentication is identity authentication during payment.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a user device, a first invocation message;
responsive to obtaining the first invocation message, determining the user device supports collecting biometric information and that preset biometric authentication information is stored on the user device, wherein the preset biometric authentication information is stored on the user device prior to obtaining the first invocation message;

sending, by the user device, information based on determining the user device supports collecting the biometric information and that the preset biometric authentication information is stored on the user device to a payment client;

receiving, by the user device, a service request;

collecting first biometric authentication information of a user associated with the service request;

comparing the first biometric authentication information with the preset biometric authentication information;

determining the first biometric authentication information and the preset biometric authentication information are consistent;

reading a pre-stored digital signature certificate private key; wherein the digital signature certificate private key is generated based on a verification of an ID of the user, an ID of the user device, and result information of a comparison between the first biometric authentication information and the preset biometric authentication information;

digitally signing the service request according to the digital signature certificate private key;

generating a biometric information verification message;

sending the biometric information verification message to a server, wherein the server is configured to read a pre-stored digital signature certificate public key corresponding to the digital signature certificate private key; and receiving, from the server, authentication result information after the server verifies the biometric information verification message according to the digital signature certificate public key.

16. The computer-implemented system of claim 15, wherein the operations further comprise generating and storing the digital signature certificate private key and the digital signature certificate public key, comprising:

receiving, by the user device, a registration request, and collecting second biometric authentication information of the user according to the registration request;

when the comparison shows that the second biometric authentication information is consistent with the preset biometric authentication information, generating the digital signature certificate private key and the digital signature certificate public key corresponding to the second biometric authentication information, and storing the digital signature certificate private key;

after the registration request is digitally signed according to a first preset private key, generating a registration request message, wherein the registration request message includes the digital signature certificate public key; and sending the registration request message to the server configured to store, after verifying and signing of the registration request message according to a first preset public key succeed, the digital signature certificate public key, wherein the first preset private key corresponds to the first preset public key.

17. The computer-implemented system of claim 16, wherein receiving the registration request and collecting the second biometric authentication information of the user according to the registration request comprises:

sending, by the user device, the registration request to the server;

receiving, from the server, a response message associated with the registration request;

verifying and signing the response message; and after the verification and signature succeed, collecting the second biometric authentication information of the user.

18. The computer-implemented system of claim 16, wherein sending the registration request message to the server comprises:

verifying, by the user device, that the user is a valid user;

performing a check on an original payment password responsive to verifying that the user is a valid user;

determining that the check is successful; and responsive to determining that the check is successful, sending the registration request message to the server.

19. The computer-implemented system of claim 16, wherein generating the digital signature certificate public key comprises generating the digital signature certificate public key corresponding to the ID of the user, the ID of the user device, and the result of the comparison.

20. The computer-implemented system of claim 15, wherein biometric authentication information comprises one or more of fingerprint information, face image information, and voice information.

* * * * *